United States Patent Office 3,536,787
Patented Oct. 27, 1970

3,536,787
PROCESS FOR DEVOLATILIZING POLYMERS
Brian F. Street, Cheshire, England, assignor to Shell Oil Company, New York, N.Y., a corporation of Delaware
No Drawing. Filed Mar. 20, 1967, Ser. No. 624,216
Claims priority, application Great Britain, May 16, 1966, 21,550/66
Int. Cl. C08f 7/04, 19/06
U.S. Cl. 260—880       3 Claims

ABSTRACT OF THE DISCLOSURE

Monomeric volatiles (including residual polymerizable monomers and/or diluents) are more completely removed from polymerization mixtures, e.g., mass polymerized polystyrene, by injecting 0.05–0.5% water and subjecting the mixture to a devolatilizing treatment.

---

The present invention is concerned with the manufacture of thermoplastic organic polymers in the course of which the polymer is obtained in a heat-plastified or molten condition in which it contains a minor amount, for example less than 6% by weight of the polymer, of a vaporizable component or components, for example, residual monomer. The present invention is also concerned with the resulting polymers.

An example of the manufacture of an organic polymer in this way is the manufacture of a styrene polymer or copolymer, for example by the bulk polymerization of styrene monomer or styrene monomer containing dissolved rubber to give polystyrene and so-called high impact polystyrene respectively; although it is to be understood that the present invention is also applicable to the manufacture of, for example, polystyrene by solution polymerization. The immediate polymerization product comprising molten polystyrene (or high impact polystyrene) containing, for example 0.5 to 4.0% by weight of unpolymerized styrene is conveniently converted into particles for supply to the plastics molding industry by conventional extrusion technique using a devolatilizing extruder which reduces the residual monomer content of the polymer prior to the extrusion of strands of polymer which are subsequently chopped into particles. In those instances in which the polymerization is carried out in the presence of a normally liquid hydrocarbon diluent, for example toluene, the resulting polymerization product will usually also contain a small amount, for example, up to 3.5% by weight, thereof; this residual hydrocarbon can also be removed in a devolatilizing extruder.

OBJECTS

Now, in accordance with the present invention, it has now been found that removal of residual monomer in a devolatilizing extruder is assisted by the presence of water in the polymer undergoing devolatilization.

According to the present invention a process for the manufacture of a thermoplastic organic polymer, in which the residual monomer and/or other vaporizable hydrocarbon content of the polymer in a heat-plastified or molten condition is reduced by a devolatilization treatment thereof, is provided, wherein the polymer is subjected to devolatilization in the presence of a minor amount of added water not exceeding 0.5% by weight of said polymer, which water is removed entirely or substantially entirely together with monomer and/or other vaporizable hydrocarbon(s) in said devolatilization treatment.

In carrying out the present invention, from 0.05 to 0.5% by weight of water is added to the zone in which devolatilization of the polymer takes place, the water being added either directly to said zone or to the heat-plastified or molten polymer fed to said zone. If desired, the water can be added as steam. Preferably, the amount of water is between 0.05 and 0.2%, for example about 0.1% by weight of the polymer. Said polymer is advantageously a styrene polymer or copolymer, e.g., a high impact polystyrene, from which up to 6% by weight of residual styrene monomer and/or other vaporizable hydrocarbon(s) is(are) removed by devolatilization. It is to be understood, however, that other organic thermoplastic polymers from which residual monomer and/or a hydrocarbon solvent or diluent must be removed from the polymer by devolatilization can also be processed in accordance with the present invention.

Other than polystyrene, suitable polymers which may be devolatilized according to the present process include polyolefins (polyethylene), block copolymers and random copolymers of styrene with conjugated dienes, as long as they are produced by solution, mass, or bulk processes. If the polymerization mixture contains more than about 6% by weight of organic volatiles, it is desirable to remove the excess, at least down to the maximum level of 6%, before injecting water.

It is already known that the addition of water to particulate polymeric material prior to feeding said material to a devolatilizing extruder, the amount of added water being sufficient to bring the water content of the particulate polymeric material to at least 5% by weight, has the advantage of avoiding or appreciably reducing degradation in the extruder of a polymeric material such as a styrene/acrylonitrile copolymer. The present invention is, however, distinguished from the latter process by the fact that a lesser amount of water, i.e., not more than 0.5% by weight of the polymer, is present during the devolatilization treatment of heat-plastified or molten polymer to remove an appreciable amount, i.e., at least 2% by weight, of residual monomer and/or other vaporizable hydrocarbon(s) therefrom, the water being present in order to assist said removal of monomer and/or other other vaporizable hydrocarbon(s).

In carrying out the present invention the required amount of water is advantageously injected, as such or as steam, into the feed line through which the heat-plastified or molten polymer is passed to the devolatilizing extruder from the preceding stage in the manufacture thereof, for example the final polymerization reactor in the case of polystyrene or high impact polystyrene manufactured by a multi-stage bulk polymerization process; alternatively the water (e.g., steam) can be injected directly into the devolatilizing extruder providing such injection is effected upstream of the extruder vent ports. For a detailed description of devolatilizing extruders suitable for use in carrying out the present invention are known in the art and, in general, it can be stated that the present invention is not limited to the use of any particular extruder.

The present invention is illustrated by the following example:

EXAMPLE

In the manufacture of a high impact polystyrene by bulk polymerization the molten polymer leaving the polymerization reactor contained between 3 and 5% by weight of residual styrene monomer. The styrene monomer content of the polymer was reduced to 0.2% by weight as a result of devolatilization treatment in the absence of added water. In accordance with the present invention 0.1% of water, by weight of the polymer, was metered into the feed line through which the molten polymer was supplied to the extruder and it was found that at the same throughput rate of the polymer through the extruer the monomer content was reduced to 0.1% by weight. This represents a significant reduction in monomer content of the polymer product judged from the point of view of the end user, to whom a monomer content as high as 0.2% by weight of the polymer can be unacceptable for some applications in view of the more stringent current market requirements. It will be appreciated that lower residual monomer contents than those at present achieved with existing devolatizing equipment might be expected to be obtainable by the use of more intensive devolatilization. However, the latter would be an expensive alternative way, in both capital cost and operating cost, of achieving the results obtainable by the present invention.

I claim as my invention:

1. In the process for the recovery of a styrene polymer from a bulk polymerization mixture comprising a major amount of styrene polymer and not more than 6% by weight of volatile monomeric organic compounds, wherein the mixture is passed from a polymerization vessel to a devolatilizing device and monomers are expelled from molten polymer, the improvement comprising injecting into the mixture, subsequent to termination of polymerization and prior to expulsion of monomers from the devolatilizing device, 0.05%–0.5% by weight of water based on the polymer, and expelling a mixture of monomer and water from said device.

2. A process according to claim 1 wherein the devolatilizing device is a devolatilizing extruder.

3. A process according to claim 1 wherein the polymer is a rubber containing high impact polystyrene composition.

References Cited
UNITED STATES PATENTS

| | | | |
|---|---|---|---|
| 2,238,446 | 4/1941 | Kuettel | 260—93.5 XR |
| 2,270,182 | 1/1942 | Collings et al. | |
| 2,849,430 | 8/1958 | Amos et al. | 260—93.5 |
| 2,713,043 | 7/1955 | Daumiller | 260—85.5 |
| 2,905,659 | 9/1959 | Miller et al. | 260—85.3 |
| 3,311,676 | 3/1967 | Toekes | 260—880 |
| 3,439,065 | 4/1969 | Luftglass | 260—880 |

JAMES A. SEIDLECK, Primary Examiner

U.S. Cl. X.R.

260—85.1, 93.5, 94.9